US011640639B2

(12) United States Patent
Ganguly

(10) Patent No.: US 11,640,639 B2
(45) Date of Patent: May 2, 2023

(54) SYSTEMS AND METHODS FOR ALLOCATING FRACTIONAL SHARES OF A PUBLIC OFFERING

(71) Applicant: Click IPO Holdings, LLC, Scottsdale, AZ (US)

(72) Inventor: Sukanta Ganguly, San Jose, CA (US)

(73) Assignee: Click IPO Holdings, LLC, Scottsdale, AZ (US)

( * ) Notice: Subject to any disclaimer, the term of this patent is extended or adjusted under 35 U.S.C. 154(b) by 0 days.

(21) Appl. No.: 17/531,358

(22) Filed: Nov. 19, 2021

(65) Prior Publication Data

US 2022/0358586 A1 Nov. 10, 2022

Related U.S. Application Data

(60) Provisional application No. 63/183,948, filed on May 4, 2021.

(51) Int. Cl.
*G06Q 40/04* (2012.01)
*G06Q 30/06* (2023.01)
*G06N 5/00* (2023.01)
*G06Q 30/0601* (2023.01)
*G06N 5/01* (2023.01)

(52) U.S. Cl.
CPC .............. *G06Q 40/04* (2013.01); *G06N 5/01* (2023.01); *G06Q 30/0611* (2013.01)

(58) Field of Classification Search
CPC ........................................... G06Q 40/04
See application file for complete search history.

(56) References Cited

U.S. PATENT DOCUMENTS

| 7,016,872 B1 | 3/2006 | Bettis et al. |
| 7,509,274 B2 | 3/2009 | Kam et al. |
| 8,275,690 B2 | 9/2012 | Wallman |

(Continued)

OTHER PUBLICATIONS

Behavioural finance in an era of artificial intelligence: Longitudinal case study of robo-advisors in investment decisions, Shanuganthan, M., in Journal of Behavorial and Experimental Finance, vol. 27, Sep. 2020 (Year: 2020).*

(Continued)

*Primary Examiner* — Mike Anderson
*Assistant Examiner* — Brandon M Duck
(74) *Attorney, Agent, or Firm* — Armstrong Teasdale LLP

(57) ABSTRACT

A share allocation (SA) computing device includes a processor in communication with a database. The processor is configured to execute a computational model including a plurality of model layers. The plurality of model layers includes a fractional node layer configured to assign each candidate investor of a plurality of candidate investors to a corresponding node. Each node is associated with a weight, and the nodes define an interconnected neural network. The fractional node layer is also configured to apply a machine learning algorithm configured to adjust the weights of the nodes in response to respective fitness values input to the nodes, and convert the adjusted weight for each node into a corresponding fraction. The fractional node layer is further configured to allocate, to each candidate investor, a respective fractional share of an offering, the fractional share corresponding to the fraction associated with the corresponding node.

16 Claims, 9 Drawing Sheets

(56) References Cited

U.S. PATENT DOCUMENTS

| | | | |
|---|---|---|---|
| 8,589,269 B1 | 11/2013 | Bendel | |
| 10,719,877 B2 | 7/2020 | Phillips | |
| 11,348,095 B2 * | 5/2022 | Fletcher | G06F 21/00 |
| 2002/0010672 A1 | 1/2002 | Waelbroeck | |
| 2003/0055758 A1 | 3/2003 | Sidhu et al. | |
| 2004/0039685 A1 | 2/2004 | Hambrecht et al. | |
| 2007/0118463 A1 | 5/2007 | Avery | |
| 2007/0150405 A1 | 6/2007 | Greenberg et al. | |
| 2010/0005035 A1 | 1/2010 | Carpenter | |
| 2012/0239553 A1 | 9/2012 | Gonen | |
| 2012/0254065 A1 | 10/2012 | Mintz | |
| 2013/0097059 A1 | 4/2013 | Bonner et al. | |
| 2013/0179259 A1 | 7/2013 | Lindauer et al. | |
| 2013/0297484 A1 | 11/2013 | Lawrence | |
| 2016/0267587 A1 | 9/2016 | Woltsovitch | |
| 2019/0026830 A1 | 1/2019 | Powell | |
| 2019/0068380 A1 * | 2/2019 | Tang | H04L 9/32 |
| 2020/0314834 A1 * | 10/2020 | Lei | H04W 72/04 |
| 2020/0396065 A1 * | 12/2020 | Guiterrez-Sherris | H04L 9/08 |
| 2021/0182966 A1 * | 6/2021 | Toffey | G06Q 40/04 |

OTHER PUBLICATIONS

ISR/WO mailed Apr. 15, 2019 for PCT/US 19/14551 filed Jan. 22, 2019, 8 pages.

* cited by examiner

SYSTEMS AND METHODS FOR ALLOCATING FRACTIONAL SHARES OF A PUBLIC OFFERING

CROSS-REFERENCE TO RELATED APPLICATIONS

This application claims the benefit of priority to U.S. Provisional Application No. 63/183,948, filed May 4, 2021, the contents and disclosure of which are incorporated herein by reference in their entirety.

BACKGROUND

The field of the disclosure relates generally to allocation of assets in an offering, and more specifically, to systems and methods for allocating fractional shares of the offering to individual participants.

Business entities undertake offerings of assets, such as initial public offerings (IPOs) and secondary offerings, to raise capital. Traditionally such offerings were targeted almost exclusively to large institutions (e.g., banks, insurance companies, hedge funds, and mutual funds) which have the resources to purchase blocks of shares. More recently, business entities engaged in IPOs and secondary offerings have found it worthwhile to include individual investors who engage in certain investing behaviors, such as holding assets acquired in an IPO over a long period of time, so as to reduce volatility in the price of the assets. Systems and methods for identifying such individual investors and integrating them as a group into the offering alongside the traditional investing institutions are disclosed, for example, in U.S. patent application Ser. No. 16/253,657 entitled SYSTEM AND METHOD FOR QUANTIFIABLE CATEGORIZATION OF CANDIDATES FOR ASSET ALLOCATION, filed on Jan. 22, 2019 and assigned to the applicant of the instant application, which is incorporated by reference herein in its entirety.

Given share price levels in many current offerings, some such individual investors operate with resources that correspond to the price of just a few shares. Because such investors are conventionally limited to purchasing whole shares, the potential participation of each investor is limited to just a few discrete levels (e.g., the purchase of one, two, three, or four shares). These discrete levels impose constraints upon any attempt to optimize the allocation of shares among such investors based on predicted investor behavior. For a simplified example, if investor A is strongly associated with a preferred behavior for a current offering, has more than sufficient resources to purchase three shares, but has insufficient resources to purchase four shares, it may be that the best predicted outcome for the business entity offering the assets would occur if investor A received 3.6 shares, rather than being limited to three shares. These effects aggregated across a large number of individual investors can become significant to the after-market performance of the offered shares. However, known processes for initial public offerings (IPOs) and secondary offerings cannot accommodate issuance of fractional shares. Although fractional shares trading is proposed for internal trades in the after-market within a small number of online broker-dealers, capital-raising asset offerings require a unit share to be the smallest individually acquirable asset, to enable the shares to subsequently trade within any exchange. Incorporating the potential for fractional shares into an initial allocation of assets presents a complex problem in view of the traditional unit share offering infrastructure.

Moreover, any rigorous evaluation of the utility of distributing shares of an asset offering in a particular distribution among hundreds, thousands, or even millions of interested individual investors must depend heavily on large data sets and factors specific to each particular offering, and poses problems of computational tractability.

It is therefore desirable for a computing device to be capable of allocating fractional shares in an asset offering in an integrated process that provides measurable utility to the offering entity, and is also computationally tractable.

BRIEF DESCRIPTION

In one aspect, a share allocation (SA) computing device is provided. The SA computing device includes at least one processor in communication with a database. The at least one processor is configured to execute a computational model including a plurality of model layers arranged in a sequence. The plurality of model layers includes a fractional node layer configured to assign each candidate investor of a plurality of candidate investors to a corresponding node. Each node is associated with a weight, and the nodes define an interconnected neural network. The fractional node layer is also configured to apply a machine learning algorithm configured to adjust the weights of the nodes in response to respective fitness values input to the nodes, and convert the adjusted weight for each node into a corresponding fraction. The fractional node layer is further configured to allocate, to each candidate investor, a respective fractional share of an offering, the fractional share corresponding to the fraction associated with the corresponding node.

In another aspect, a computer-implemented method is provided. The computer-implemented method is implemented by a share allocation (SA) computing device including at least one processor in communication with a database. The method includes executing, by the at least one processor, a computational model including a plurality of model layers arranged in a sequence. The plurality of model layers includes a fractional node layer. The method also includes assigning, by the fractional node layer, each candidate investor of a plurality of candidate investors to a corresponding node. Each node is associated with a weight, and the nodes define an interconnected neural network. The method further includes applying, by the fractional node layer, a machine learning algorithm configured to adjust the weights of the nodes in response to respective fitness values input to the nodes, and converting, by the fractional node layer, the adjusted weight for each node into a corresponding fraction. Additionally, the method includes allocating, to each candidate investor, a respective fractional share of an offering, the fractional share corresponding to the fraction associated with the corresponding node.

In yet another aspect, at least one non-transitory computer-readable storage media having computer-executable instructions embodied thereon is provided. When executed by a share allocation (SA) computing device having at least one processor in communication with a database, the computer-executable instructions cause the at least one processor to execute a computational model including a plurality of model layers arranged in a sequence, the plurality of model layers including a fractional node layer. The computer-executable instructions also cause the at least one processor to assign, by the fractional node layer, each candidate investor of a plurality of candidate investors to a corresponding node. Each node is associated with a weight, and the nodes define an interconnected neural network. The computer-executable instructions further cause the at least one processor to apply, by the fractional node layer, a machine learning algorithm configured to adjust the weights of the nodes in response to respective fitness values input to the nodes, and convert, by the fractional node layer, the adjusted weight for each node into a corresponding fraction. Additionally, the computer-executable instructions cause the at least one processor to allocate, by the fractional node layer to each candidate investor, a respective fractional share of an offering, the fractional share corresponding to the fraction associated with the corresponding node.

DETAILED DESCRIPTION

Figure 1:
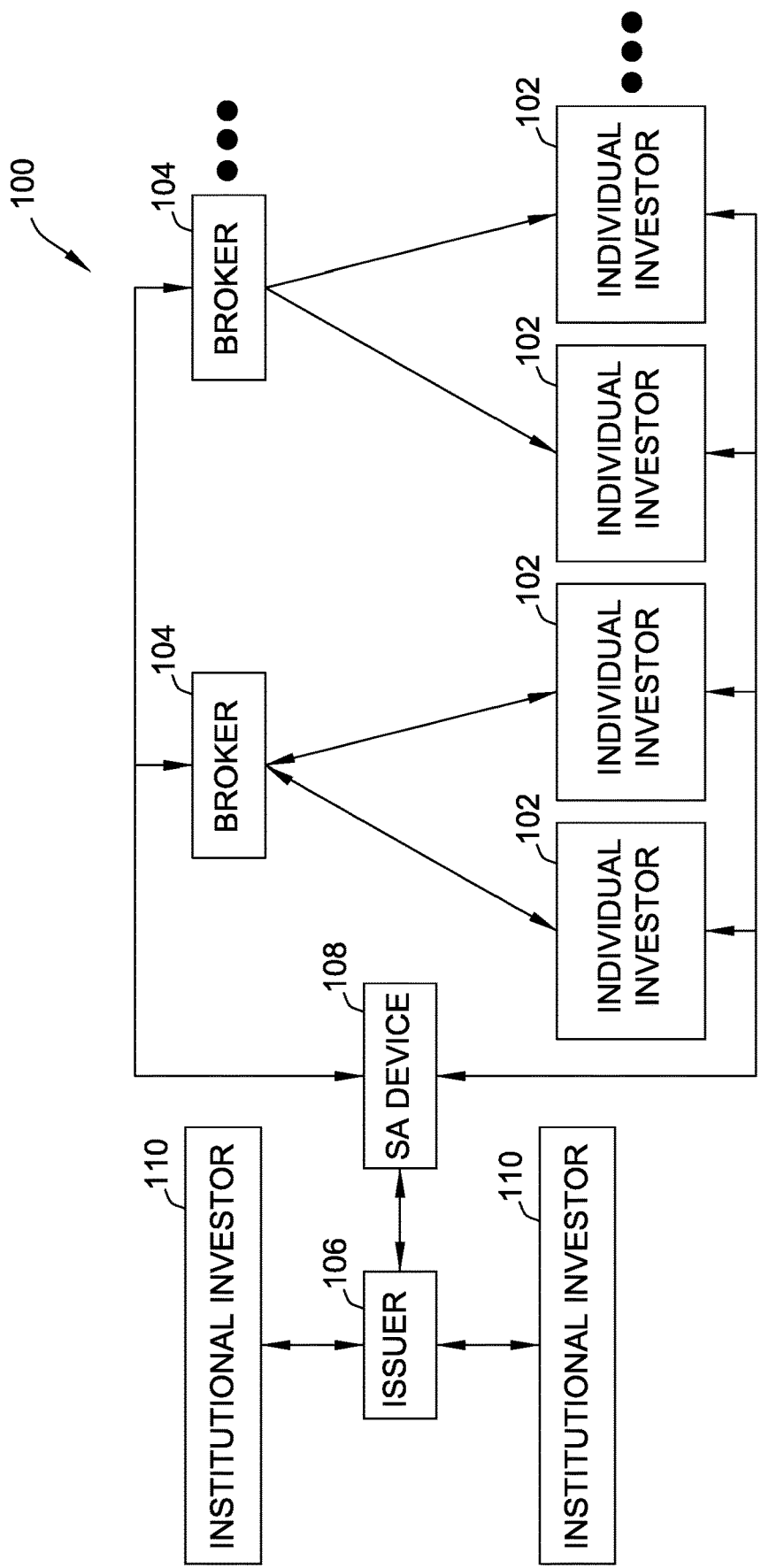
FIG. 1 is a schematic diagram of an example computer-implemented public asset offering illustrating an example share allocation computing device in communication with investor computing devices, broker-dealer computing devices, and an issuer computing device.

The following detailed description illustrates embodiments of the disclosure by way of example and not by way of limitation. The description enables one skilled in the art to make and use the disclosure, and describes several embodiments, adaptations, variations, alternatives, and uses of the disclosure, including what is presently believed to be the best mode of carrying out the disclosure. The disclosure is described as applied to an example embodiment, namely, systems and methods for allocating assets in a public offering, such as but not limited to an initial public offering (IPO) of shares in a company. The system described herein includes at least one share allocation (SA) computing device that allocates assets in a public offering. The SA computing device may be in communication with at least one broker-dealer computing device, a large number of investor computing devices, and at least one issuer computing device. In particular, while institutional investors, which represent aggregations of individuals (e.g., pension funds, publicly owned institutions) and are typically in a position to purchase relatively large blocks of shares, may participate in the offering by receiving communications directly from an issuer of the shares in a conventional fashion, the SA computing device is in communication with individual investors (e.g., individual human beings or small businesses), who typically are not in a position to purchase large blocks of shares and are not, by themselves, involved directly with the issuer of the shares. The SA computing device aggregates offers to buy from candidate individual investors, determines which candidate investors have desirable characteristics (e.g., an inclination to hold shares purchased in the offering for a long period of time, which reduces a volatility of the share price after the offering is completed) to the business entity offering the shares, and submits an aggregate offer to buy on behalf of the individual investors on a scale competitive with the institutional investors.

The SA computing device includes at least one processor in communication with a memory. The SA computing device is further in communication with at least one database for storing information, such as historical investor data for a plurality of candidate individual investors. In the example embodiment, the SA computing device utilizes the historical investor data, along with data associated with the particular offering under consideration, to predict which candidate individual investors will provide the most value to the business entity making the offering. The SA computing device applies a multi-level model to allocate shares of the offering among individual investors. In particular, given that the available resources of each candidate individual investor may enable the purchase of only a small number (e.g., three, five, or seven) of shares, the ability to optimize the allocation of solely whole values of shares to these individuals would be severely constrained. In other words, there is little flexibility to optimize when selecting from among solely a few discrete allocation values for each worthy candidate investor. The SA computing device removes this constraint from the optimization problem by optimizing to fractions of a share for each individual investor.

Moreover, an optimization process that relies solely on exhibited attributes or notional attributes of the candidate investors and the offering under consideration is unlikely to approach the best achievable result in actual practice. Rather, it is the case that hidden or latent knowledge within the input data set, to the extent it can be uncovered in a computationally practical fashion, leads to a better prediction of which candidate investors, and which corresponding share amounts allocated per investor, will provide the highest achievable benefit to the business entity offering the shares. However, exposing and utilizing this hidden or latent knowledge is a quite complex computational processing challenge, particularly when requests to participate are received from a large number of individual investors. The SA computing device solves this computational challenge by applying a sequence of model layers. More specifically, each layer provides an increasingly beneficial (in terms of performance desired by the business entity and the issuer) output for the allocation of shares to the candidate investors, and one or more layers (after the first) operate primarily on the output of the previous upstream layer, which reduces computational complexity by reducing a need to operate on full model state information passed from layer to layer. In addition, a downstream layer provides relative optimization at a scale of fractions of a share allocated to worthy candidate investors, which improves results relative to conventional processes which can only allocate assets in multiples of whole shares. The system disclosed herein thus enables the solution of a computationally complex problem by applying different types of models in a layered approach, maintaining the processing load for each layer at a tractable level even when exceedingly large data sets must be processed.

The historical investor data may include data fields relating to past investment activity of the plurality of individual investors conducted through channels external to the SA computing device (e.g., through their associated broker-dealers). For example, such "external" historical investor data may include one or more of: average number of days holding an asset at peak value, average number of days holding an asset of a particular asset classification, percentage of the aftermarket accumulation of a particular asset, number of transactions per year, and/or average size of transaction per buying power at the time of the transaction. Historical investor data may also include data relating to previous investment activity with respect to public offerings previously offered through the SA computing device, referred to as "internal" historical investor data. For example, such internal historical investor data may include one or more of: the fraction of assets actually purchased relative to the amount of assets the investor indicated a willingness to purchase at the candidate stage, the number of days the previous offering was held divided by a threshold number of days, a percentage of social share by the investor, and/or size of the order with respect to buying power. The threshold number of days is selected as a threshold time period for holding the assets that is associated with stability of the asset price after the offering. The percentage of social share by the investor is a percentage of offerings previously offered to the investor through the SA computing device for which the investor has electronically shared information regarding the offering (e.g., by sharing that the investor has made an investment via a social media platform).

In some embodiments, historical investor data may include indications of a specific classification of industry to which the asset offering was related (e.g., defense, energy, or technology). Thus, the layered model may accurately predict, for an asset offering of a particular classification, the behavior of the investor with respect to the particular asset offering (e.g., how long the investor will hold assets acquired in the offering). Consequently, the output of the model may be trusted by issuers in a new asset offering to indicate the desirability in allocating assets to particular individual investors in the environment and to the aggregate of individual investors in the environment based on the industry to which the new asset offering is related.

In the example embodiment, the SA computing device is further configured to transmit notices of an asset offering to the plurality of individual investors in the environment. The notices of the asset offering may be transmitted to each of the plurality of investors in the environment, or to a subset of the plurality of investors (e.g., investors identified as viable candidates with respect to the particular offering in a pre-processing step). In the example embodiment, the SA computing device is further configured to receive responses from these candidate investors indicating a degree of investor willingness to take part in the offering. The responses may include, for example, a statement of an amount the candidate investor is willing to invest in the offering. Because the SA computing device is in communication with the broker-dealer associated with each investor, the SA computing device can determine whether each candidate investor is capable of investing the amount stated by the investor and decline to consider offers where the candidate investor is not capable of investing the stated amount (e.g., when the investor lacks adequate funds). Moreover, certain data associated with a timing of a candidate investor's response may be used as input data with respect to one or more layers of the model. For example, an offering may be open over a ten-day window, and the relative timing of each offer to participate from a candidate investor is used as an input to one or more layers of the model.

In the example embodiment, the SA computing device is further configured to determine a total amount of assets available to allocate to individual investors indicating a willingness to invest in the public offering. The SA computing device may generate and transmit an offer to the issuer including a number of responses received from individual candidate investors indicating a willingness to take part in the offering, an aggregate amount of funds stated by the candidate investors indicating a willingness to take part in the offering, and an indicator of an aggregate expected performance (e.g., an indication of how long the candidate investors can be expected to hold the assets, on a per-investor and/or statistical distribution basis) for the candidate individual investors indicating a willingness to take part in the offering. In response, the SA computing device may receive from the issuer an amount of available assets that are available for allocation to the plurality of individual investors. The issuer, in determining the amount of assets to offer via the SA computing device, may utilize the asset distribution computed by the model for each of the plurality of candidate individual investors willing to take part in the offering. For example, the issuer may be offering shares of a technology corporation in an IPO. If the model for the individual investors willing to take part in the IPO indicates that the individual investors are likely to purchase and hold technology stock over a long period of time, the issuer may decide a greater amount should be allocated via the SA computing device because the investors are likely to engage in investing behavior favorable to the technology corporation (e.g., by holding the acquired technology corporation stock over a long period of time).

In the example embodiment, the SA computing device is further configured to allocate the available assets to the candidate individual investors based on the allocation determined by the model. The SA computing device may normalize the model allocation such that the sum of the normalized shares allocated to the candidate investors equals the total amount of assets to be allocated to candidate individual investors. The SA computing device may allocate the available assets so that each of the candidate individual investors taking part in the offering receives an allocation correlating to the allocation produced by the model for the individual investor.

The technical problems addressed by the disclosure include at least one of: (i) inability of computer-implemented asset offering systems to sell fractional shares of an asset offering; (ii) inability of algorithms to effectively optimize a distribution of assets among a large number of recipients due to the constraint that only a few discrete levels of whole shares may be allocated to some recipients; and (iii) intractability of the computational problem of predicting and evaluating the comparative utility, to an issuer of the assets, of different distribution amounts across a large number of recipients.

The technical effects achieved by the systems and methods described herein include at least one of: (i) executing a computational model including a plurality of model layers arranged in a sequence; (ii) assigning, by a fractional node layer, each candidate investor of a plurality of candidate investors to a corresponding node, wherein each node is associated with a weight, and wherein the nodes define an interconnected neural network; (iii) applying, by the fractional node layer, a machine learning algorithm configured to adjust the weights of the nodes in response to respective fitness values input to the nodes; (iv) converting, by the fractional node layer, the adjusted weight for each node into a corresponding fraction; (v) allocating, to each candidate investor, a respective fractional share of an offering, the fractional share corresponding to the fraction associated with the corresponding node; (vi) outputting a second allocation of shares of the offering among the plurality of candidate investors, the second allocation of shares including, for each of the plurality of candidate investors, a respective number of whole shares from a first allocation of shares, adjusted by the respective fractional share; (vii) constraining the weight for each node such that a purchase price of the shares in the second allocation to the corresponding candidate investor does not exceed a stated amount the candidate investor is willing to spend on the offering; (viii) implementing, by the fractional node layer, the machine learning algorithm including a heuristic algorithm; (ix) applying the heuristic algorithm to groups of nodes, including adjusting upward the weight of at least one relatively most fit node in each group; (x) iteratively, re-grouping the nodes and applying the heuristic algorithm to the re-grouped nodes; (xi) assigning, by a first upstream layer of the plurality of model layers, each candidate investor of a second plurality of candidate investors to a corresponding node of the first upstream layer, wherein each node of the first upstream layer is associated with a set of weights; (xii) inputting to each node of the first upstream layer a vector of data associated with the corresponding candidate investor; (xiii) generating an investor score for each candidate investor by applying the set of weights to the respective vector of data, wherein the investor score for the candidate investor corresponds to the fitness value for the candidate investor; (xiv) retrieving example input vectors drawn from historical investor data and actual outcome data associated with the example input vectors, and tuning the set of weights by applying a second machine learning algorithm to the example input vectors and the actual outcome data; and (xv) implementing the second machine learning algorithm including a backpropagation algorithm.

The resulting technical benefits achieved by the systems and methods of the disclosure include at least one of: (i) enabling computer-implemented asset offering systems to sell fractional shares of an asset offering; (ii) a computational model capable of effectively optimizing a distribution of assets among a large number of recipients by removing the constraint that only a few discrete levels of whole shares may be allocated to some recipients; and (iii) a computational model that enables predicting and evaluating the comparative utility, to an issuer of the assets, of different distribution amounts across a large number of recipients in a computationally practicable fashion.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example environment 100. Environment 100 includes at least one investor computing device 102, at least one broker-dealer computing device 104, an issuer computing device 106, and a share allocation (SA) computing device 108.

Each investor computing device 102 is associated with an investor in environment 100. Each investor may be an individual who desires to purchase assets through public offerings. For example, the investor may wish to purchase stock in a corporation having an initial public offering. Each investor may have associated historical investor data corresponding to the investor's historical involvement in IPOs and other public offerings. Each investor computing device 102 is in direct communication with SA computing device 108. As shown in FIG. 1, in the example embodiment, environment 100 may include a plurality of investor computing devices 102 each associated with a respective individual investor. For example, each individual investor registers with a service provided by SA computing device 108. In response to the registration, SA computing device 108 transmits notifications of upcoming public asset offerings to investor computing device 102, and may indicate an offering time window during which requests from investor computing device 102 to purchase assets will be accepted. For example, but not by way of limitation, SA computing device 108 transmits notifications to investor computing device 102 via a client application installed on investor computing device 102, or via a web page accessible to investor computing device 102 in response to investor computing device 102 transmitting log-in credentials to the web server.

In response, investor computing device 102 may transmit a request to SA computing device 108 including request data indicating the investor is willing to invest in an upcoming offering. The request data may indicate an amount of money the investor wishes to invest in the upcoming offering, and may be time-stamped. The time stamp may include, for example, at least one of a date/time of submission of the request, and a cardinality of the request relative to requests for the current offering received from other investor computing devices 102 (e.g., the request data indicates that the request was the first, second, third, etc. request received by SA computing device 108 for the current offer). Some embodiments include offers transmitted to hundreds, thousands, tens of thousands, or millions of investor computing devices 102.

Each broker-dealer computing device 104 is associated with a corresponding broker-dealer in environment 100. The broker-dealer is an individual or organization that engages in the business of trading securities (e.g., stock) on behalf of the broker-dealer's customers (e.g., individual investors). Broker-dealer computing device 104 may store or generate historical investor data corresponding to investment activity of individual investors through the broker-dealer corresponding to broker-dealer computing device 104. Broker-dealer computing device 104 is in direct communication with SA computing device 108 and with investor computing devices 102 of each customer/individual investor of the broker-dealer. Broker-dealer computing device 104 transmits historical investor data accumulated by broker-dealer computing device 104 to SA computing device 108. As shown in FIG. 1, environment 100 may include a plurality of broker-dealer computing devices 104 each associated with a corresponding broker-dealer.

Issuer computing device 106 is associated with an issuer of a public offering such as an IPO. The issuer sells, for example, shares of stock in a corporation in exchange for funds. The issuer may select investors in the public offering based on, for example, a perceived financial capability and expected future investing behavior. As such, the issuer may be in communication with any number of institutional investors 110 and may allocate any suitable portion of the offering to institutional investors 110 outside the channels provided by SA computing device 108. Additionally or alternatively, the issuer may consider allocating a portion of the offering to individual investors via SA computing device 108. The issuer may consider the individual investors in environment 100 in aggregate, such that the issuer's decision on how much of the offering to allocate may be based on the aggregate perceived financial capability and expected future investing behavior of all the individual investors in environment 100. Issuer computing device 106 is in direct communication with SA computing device 108 to receive data regarding the expected behavior of the individual investors. While one issuer computing device 106 is shown in FIG. 1, environment 100 may include a plurality of issuer computing devices 106 each associated with a corresponding issuer.

SA computing device 108 is further in communication with at least one database (which may be implemented by a storage device 625 shown in FIG. 6) for storing information, such as historical investor data. In the example embodiment, the historical investor data is stored in at least one data structure having a plurality of data fields and a plurality of records, each record including a plurality of data values corresponding to the plurality of data fields. The historical investor data may include data fields relating to past investment activity of the plurality of individual investors executed through channels external to SA computing device 108. In the example embodiment, the external historical investor data may be received from one or more of the broker-dealer computing devices 104 in communication with SA computing device 108. For example, the external historical investor data fields may include one or more of average number of days holding an asset at peak value, average number of days holding an asset of a particular asset classification, percentage of the aftermarket accumulation of a particular asset, number of transactions per year, and/or average size of transaction per buying power at the time of the transaction.

Historical investor data may also include data relating to previous investment activity with respect to public offerings through SA computing device 108, referred to as "internal" historical investor data. In some embodiments, SA computing device 108 is configured to capture data from previous investment activity of the plurality of individual investors conducted through SA computing device 108, and store the captured data as at least a portion of the historical investor data in the database. For example, the internal historical investor data fields may include one or more of: the fraction of assets actually purchased relative to the amount of assets the investor indicated a willingness to purchase at the candidate stage, the number of days the previous offering was held divided by the threshold number of days, percentage of social share by the investor, and/or size of the order with respect to buying power. As discussed above, the percentage of social share by the investor is a percentage of offerings previously offered to the investor through the SA computing device for which the investor has electronically shared information regarding the offering (e.g., by sharing that the investor has made an investment via a social media platform). In some embodiments, such sharing over electronic social media platforms by candidate individual investors is a behavior that the issuer and/or corporation offering the asset wish to encourage in order to build positive momentum for the offering.

Figure 2:
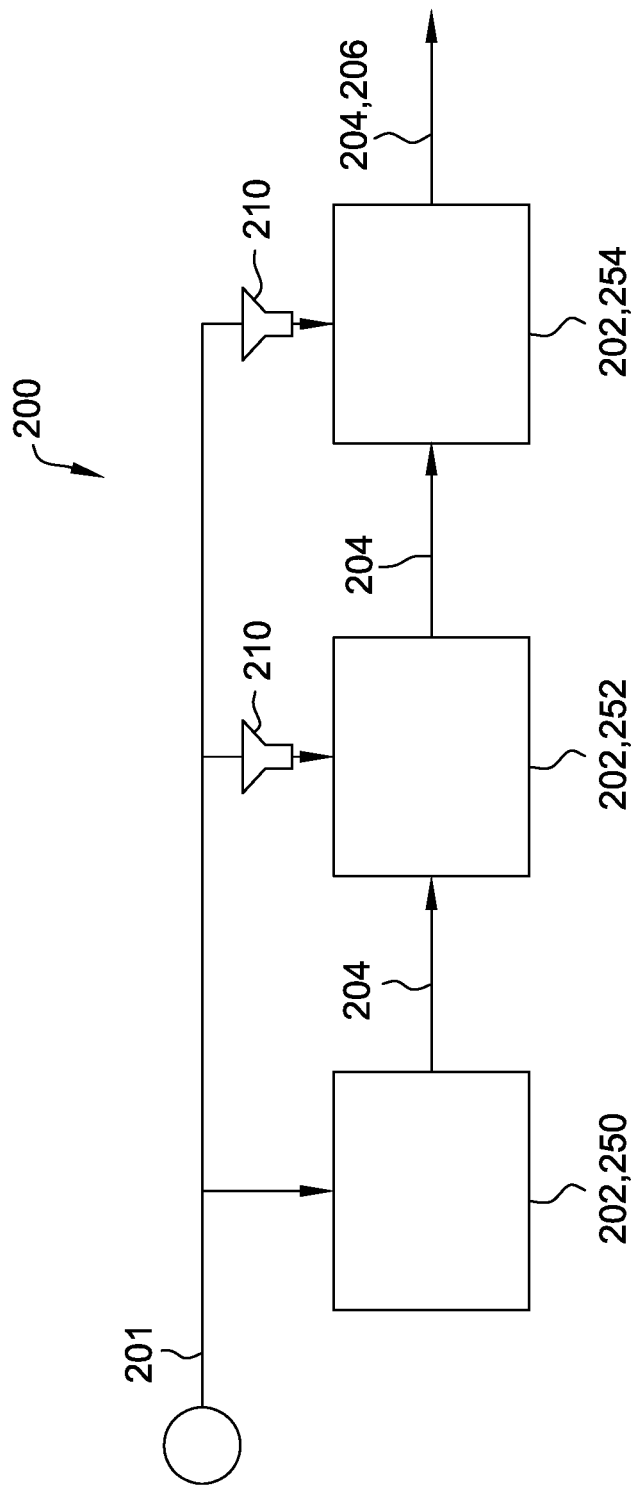
FIG. 2 is a schematic data flow diagram illustrating an example of a computational model executed by the share allocation computing device shown in FIG. 1.

FIG. 2 is a schematic data flow diagram illustrating an example of a computational model 200 executed by SA computing device 108. In order to allocate shares of an asset offering proffered by issuer computing device 106, SA computing device 108 feeds an input data signal 201, representative of, for example, request data associated with requests submitted by investor computing devices 102 to participate in a current asset offering and/or the historical investor data, as inputs to model 200. As noted above, SA computing device 108 may transmit notifications of offers to hundreds, thousands, tens of thousands, or millions of investor computing devices 102, and may receive requests to participate in the offering from a commensurate number of investor computing devices 102. Accordingly, the sheer quantity of data included in input data signal 201 creates a problem of computational tractability and scalability for any algorithmic attempt to identify, according to a suitable basis of utility, an optimal allocation of shares of the offering among those investor computing devices 102.

To solve this problem of computational tractability and scalability, model 200 includes a plurality of model layers 202 arranged in a sequence, i.e., with a model layer output 204 of each respective upstream model layer 202 being transmitted as an input to a downstream model layer 202. The layer output 204 of each model layer 202 includes data representative of an allocation of shares of the offering among investor computing devices 102 that submitted requests to participate in the offering. Moreover, the layer output 204 of each upstream model layer 202 is passed as an input signal to a next downstream model layer 202. Each downstream model layer 202 successively refines the layer share allocation received from the previous upstream layer 202 to better meet the objectives of the issuer and the business entity represented by the issuer, while operating within the request parameters provided by each investor computing device 102. Notably, in the example embodiment, each upstream model layer 202 executes with no knowledge or inhibitions about downstream model layers 202. In other words, each model layer 202 operates as if the domain of model 200 ends after completion of that model layer 202, allowing one or more layers 202 to execute in a substantially stateless fashion.

For example, in the illustrated embodiment, a first model layer 202, designated model layer 250, operates on input data signal 201 and generates a first layer model output 204, including a share allocation. The first layer share model output 204 is provided as an input signal to a second model layer 202, designated model layer 252. In some embodiments, input data signal 201 is also provided to second model layer 252, as illustrated in FIG. 2. In some such embodiments, input data signal 201 is filtered, as illustrated as filter 210, before reaching one or more downstream model layers 202, to remove portions of input data signal 201 associated with candidate investors who did not pass a minimum requirements filter embodied in model layer 250, as discussed below. However, in other embodiments, input data signal 201 is not provided to one or more downstream model layers 202. Model layer 252 operates on the input first layer share allocation, and optionally on input data signal 201, and generates a second layer model output 204 including a refined share allocation. Similarly, the second layer model output 204 is provided as an input signal to a third model layer 202, designated model layer 254. In some embodiments, input data signal 201 is also provided to model layer 254, as discussed above. However, in other embodiments, input data signal 201 is not provided to model layer 254. Model layer 254 operates on the input second layer share allocation, and optionally on input data signal 201, and generates a third layer model output 204 including a further refined share allocation. In the illustrated embodiment, the share allocation included in third layer model output 204 is stored by SA computing device 108 as a purchase offer share allocation 206, used to generate details of the aggregate offer to purchase assets submitted to issuer computing device 106 and to allocate actual shares received from issuer computing device 106 among the candidate investors.

Although three model layers 202 are shown in the illustrated embodiment, it should be understood that in other embodiments, any suitable number of model layers 202 may be implemented.

Input data signal 201 may include data drawn from the historical investor data for a plurality of investors, such as, for each investor, one or more of average number of days holding an asset obtained in a previous offering at peak value, average number of days holding an asset obtained in a previous offering of a particular asset classification (e.g., defense, energy, or technology), percentage of the aftermarket accumulation of a particular asset obtained in a previous offering, number of transactions per year in previous asset offerings, and/or average size of transaction in a previous offering per buying power at the time of the transaction. As noted above, in some embodiments this information may be obtained from investment transactions executed external to SA computing device 108, such as via broker-dealer computing devices 104. Data included in input data signal 201 and drawn from the historical investor data may additionally or alternatively include one or more of the fraction of assets actually purchased relative to the amount of assets the investor indicated a willingness to purchase at the candidate stage of a previous offering, percentage of social share by the investor of a previous offering, and/or size of the order in a previous offering with respect to buying power of the investor at the time of the previous offering. As noted above, in some embodiments this information may be generated internally within SA computing device 108 based on past activity of the candidate IBP with SA computing device 108.

Additionally or alternatively, input data signal 201 may include data drawn from the request data received from the plurality of investors for the current offer, such as, for each investor, the amount of money the investor wishes to invest in the current offering, a date/time of submission of the request to invest in the current offering, and a cardinality of the request relative to requests for the current offering received from other investors.

In some embodiments, model layer 250 is implemented as a qualification model layer. More specifically, model layer 250 applies a rules-based filter to respective portions of input data signal 201 associated with each candidate investor to determine whether the respective candidate investor meets an initial qualifying threshold for receiving shares in the current offering. The filter may apply rules against one or more exhibited or notional data attributes of the candidate investors, such as current financial resources of the candidate investor available for investment (as observed, for example, by the broker-dealer computing device 104 associated with the candidate investor and/or by previous interactions with SA computing device 108), the stated amount the candidate investor is willing to invest in the current offering, any undesirable historical performance by the candidate investor (e.g., relatively quick sale of acquired shares into the aftermarket, as observed, for example, by the associated broker-dealer computing device 104) in a similar previous offering, etc. Exhibited or notional data attributes refer to quantities expressly present in input data signal 201, or easily derivable therefrom. If the portions of input data signal 201 corresponding to a particular candidate investor do not pass the initial qualifying threshold filter, that particular candidate investor is removed from consideration for receiving shares in the asset offering. The layer output 204 of model layer 250 includes a share allocation for only those candidate investors that successfully pass the initial qualifying threshold filter.

Notably, model layer 250 operates on (e.g., accesses) the full input data signal 201, which includes comprehensive historical investor data and request data for hundreds, thousands, tens of thousands, or millions of candidate investors who submitted requests to buy shares via associated investor computing devices 102. Accordingly, in order to maintain a computational tractability of model layer 250, in some embodiments no optimization per se is performed for the candidate investors in model layer 250. Instead, every candidate investor that successfully passes the initial qualifying threshold filter, based on exhibited or notional data attributes, is assigned the same small, predetermined base number of shares in the share allocation of layer output 204. More computationally rigorous optimization of share allocation is preserved for downstream model layers 202, which typically operate on a reduced portion of input data signal 201 due to the removal of candidate investors by the filter in upstream model layer 250.

Alternatively, model layer 250 selectively passes a subset of the candidate investors who responded with requests to participate in the current offering to one or more downstream model layers 202 in any suitable fashion that enables model 200 to function as described herein.

In certain embodiments, model layer 250 also calculates a number of shares that will be provided in layer output 204 as available for further allocation by the next downstream model layer 202. The number of shares available for further allocation may be determined based on notice from issuer computing device 106 of an actual number of shares to be sold via distribution through SA computing device 108, less the base allocation already made in model layer 250 to candidate investors that passed the initial qualifying threshold filter. Alternatively, in cases where final notice from issuer computing device 106 of the actual number of shares available has not yet been received, the number of shares available for further allocation may be an estimated number based on, for example, the number of candidate investors that passed the initial qualifying threshold filter, an aggregation of the stated amounts each candidate investor that passed the filter is willing to invest in the current offering, and/or other suitable factors. After the estimated number of shares is allocated by downstream model layers 202, adjustments to the allocation (e.g., on a pro rata basis) may be made when the actual number of shares available for allocation by SA computing device 108 is determined.

Figure 3:
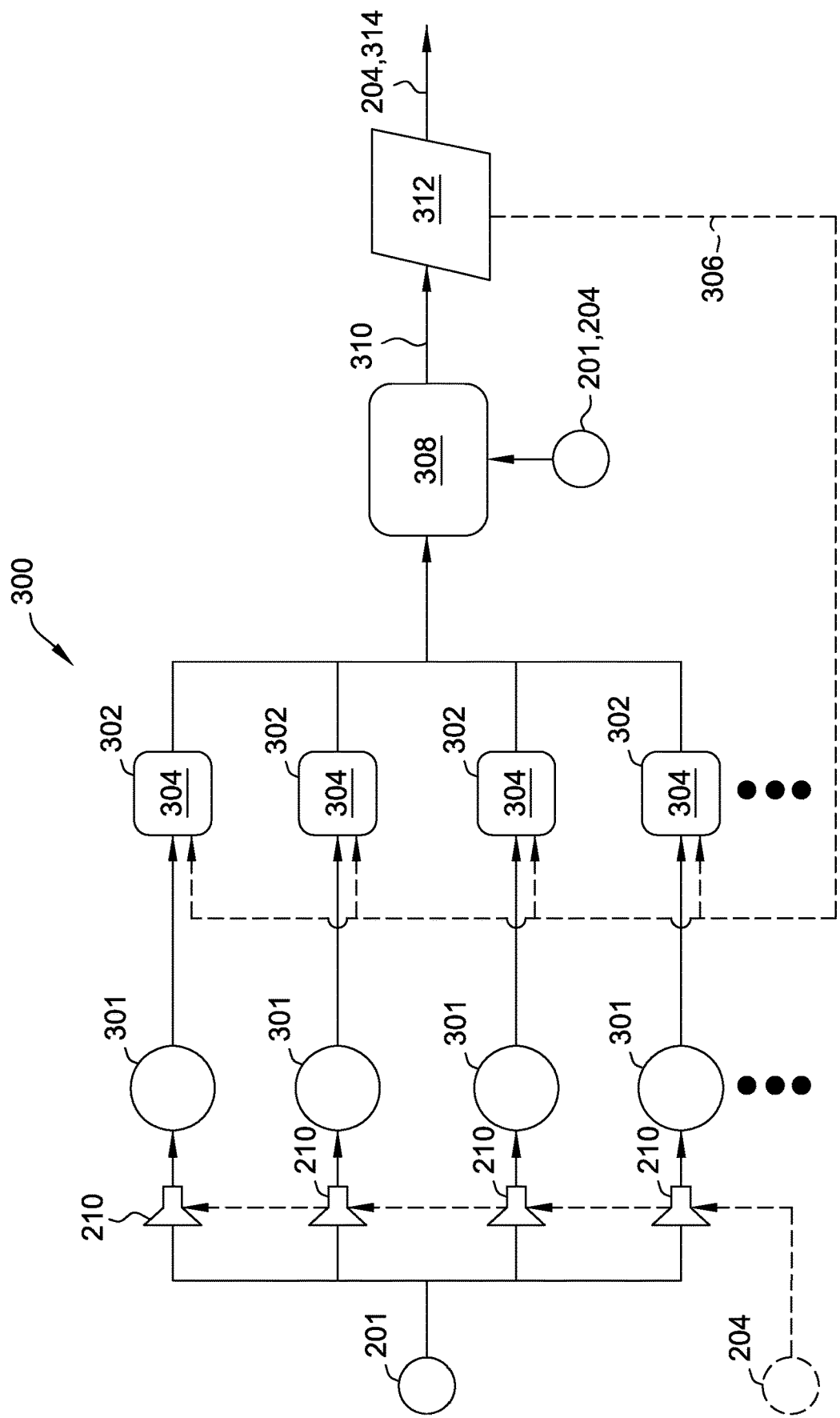
FIG. 3 is a schematic block diagram illustrating an example isolated node layer that may be implemented as one of the plurality of computational layers shown in FIG. 2.

FIG. 3 is a schematic block diagram illustrating an example implementation of one of model layers 202 as an isolated node layer 300. In the example embodiment, isolated node layer 300 is implemented as an intermediate model layer 252, downstream from the first model layer 250 implemented as the qualification model layer. Alternatively, isolated node layer 300 is implemented at any suitable upstream or downstream model layer 202.

In the example embodiment, each candidate investor included in the layer output from the immediately upstream layer 202 is represented as a node 302. Nodes 302 may be viewed as neurons that define a simple neural network implemented by isolated node layer 300. Output 204 from the upstream model layer 202 is used identify candidate investors eligible for allocations by the current node layer 300, and filter 210 for node layer 300 extracts the vector 301 of input data signal 201 corresponding to the respective candidate investor for input to the associated node 302. Each node 302 is associated with a set of weights 304 (e.g., and/or biases) that are applied to corresponding values within the vector 301 (e.g., and/or portion) of input data signal 201 associated with the respective candidate investor. In the example embodiment, the same set of weights 304 is applied by each node 302. Alternatively, the set of weights applied by at least one node 302 differs from that applied by others of nodes 302.

For example, vector 301 for each respective candidate investor may be a vector of values including one or more of: absolute size of the stated amount the candidate investor is willing to invest in the current offering; relative size of the stated amount the candidate investor is willing to invest in the current offering, as compared to the aggregate total of the stated amounts of all candidate investors; relative size of the stated amount the candidate investor is willing to invest in the current offering, as compared to current purchasing power of the candidate investor (as observed, for example, by the associated broker-dealer computing device 104); time elapsed between an opening of the current offering window to individual investors and the time the request to participate was received from the corresponding computing device 102; cardinality of receipt of the request to participate from the corresponding computing device 102 (i.e., was the request received first, second, third, etc. in time among all requests received for the current offering); number of investment transactions by the candidate investor over one or more time frames (e.g., previous 24 months, previous 12 months, previous 6 months, previous 3 months, as observed, for example, by the associated broker-dealer computing device 104 and/or SA computing device 108); number of investment transactions in a same category (e.g., transportation, pharmaceutical, energy) by the candidate investor over one or more time frames); amount of time a previous offering was held by the candidate investor, in absolute time or as compared to a threshold time; percentage of social share of previous participations by the candidate investor; and/or any other suitable values.

Likewise, the set of weights 304 associated with nodes 302 may be a set of values, with each weight value in the set applied to a respective value in vector 301 for the candidate investor. Values of weights 304 are selected such that application of weights 304 to the vector 301 for each candidate investor results in an investor score proportionate to a fitness of the candidate investor, measured in terms of utility to issuer computing device 106 (and thus ultimately in terms of utility to the business entity offering the assets). In other words, the investor score represents a predicted likelihood that the candidate investor will exhibit a behavior preferred by issuer computing device 106 with respect to the current offering (e.g., that the candidate investor would hold shares obtained in the current offering for at least a threshold period of time), with a higher investor score corresponding to a higher likelihood of the preferred behavior and a lower investor score corresponding to a lower likelihood of the preferred behavior.

In some embodiments, the set of weights 304 is established or "tuned" via application of a machine learning algorithm. Machine learning refers broadly to various algorithms that may be used to train isolated node layer 300 to identify and recognize patterns in existing data in order to facilitate making predictions for subsequent new input data. Using machine learning, the set of weights 304 may be automatically tuned based upon example input vectors 301 drawn from historical investor data and historical request data for previously completed offerings of shares, and corresponding actual outcome data for those previously completed offerings. For example, the actual outcome data indicates actual investor behavior (e.g., actual time until sale of the acquired assets in the aftermarket) associated with each example input vector 301. Weights 304 are tuned based upon the example input vectors and the actual outcome data drawn from previously completed offerings in order to yield valid and reliable investor score outputs for novel input vectors 301 for a current offering. For example, isolated node layer 300 includes an optimization module 312 programmed to apply a loss function to the output of nodes 302 generated in response to the example input vectors. It should be understood that terms such as "optimization" and "optimize" in this context need not refer to a deterministic single best or "optimal" solution for the set of weights 304, but rather to a solution for the set of weights 304 that tends to reduce the loss function relative to the allocation of shares received in model layer output 204 from the upstream model layer 250.

In some embodiments, the loss function is defined as a discrepancy between the predicted time that a respective investor would hold an asset, as represented by the investor score based on example vector 301 and a current state of the set of weights 304, and the actual time that the respective investor held the asset, as indicated in the actual outcome data. A suitable backpropagation algorithm, represented schematically by dashed line 306, is then applied to adjust the set of weights 304 to minimize the loss function. In this fashion, isolated node layer 300 is trained to produce investor scores that reliably predict a degree to which the candidate investor will exhibit a post-offering behavior preferred by issuer computing device 106. Alternatively, the set of weights 304 are selected in any suitable fashion.

In some embodiments, vector 301 also includes an indicator for whether the broker-dealer computing device 104 associated with the respective investor supports allocation of fractional shares, and the value in the set of weights 304 corresponding to that indicator is constrained to bias in favor of allocating shares to such investors. For example, the marginal allocation of additional whole shares to such investors in model layer 252 enables leveraging the added utility of fractional share allocation among such investors in a downstream layer 254, as described below, to achieve a better final output allocation. Alternatively, an ability of the associated broker-dealer computing device 104 to support allocation of fractional shares is not considered in model layer 252.

Notably, isolated node layer 300 is "isolated" in the sense that there is no signal path connecting node 302 for a particular candidate investor to portions 301 of input data signal 201 associated with other candidate investors. Rather, each node 302 operates to apply the set of weights 304 solely to the vector 301 associated with the same candidate investor, thereby reducing a computational load that would be required to train and execute model layer 252 if each node 302 operated on vectors 301 for multiple candidate investors. Thus, in certain embodiments, the architecture of isolated node layer 300 enables hidden complexity or relationships within the data representing any particular candidate investor to be discovered and exploited (e.g., through application of machine learning algorithms to set the weights/biases for nodes 302 as described above), while avoiding the exponentially higher computational burden of an interconnected node layer at this stage of model 200. For example, the reduced computational burden enables isolated node layer 300 to be re-trained periodically on a relatively frequent basis (e.g., every 12 hours) to incorporate newly available external historical investor data and request data obtained from one or more broker-dealer computing devices 104, and/or re-trained each time a preferred asset holding period elapses after the completion of an asset offering handled SA computing device 108 to incorporate the most recent internal historical investor data and actual investor post-offering behavior.

In the example embodiment, isolated node layer 300 also includes a layer allocation module 308 that outputs a data signal 310 representative of an allocation of shares among investor computing devices 102 associated with each node 302. More specifically, after application of the set of weights 304 to vector 301 of input data signal 201 for each respective candidate investor node 302 to arrive at investor scores, layer allocation module 308 allocates, among the respective investors represented by nodes 302, in blocks of whole shares and based on the relative investor scores, the number of shares identified as available for further allocation in layer output 204 received from the upstream model layer 202. For example, the available shares are allocated in proportion to the respective investor's investor score, as constrained by the stated amount the investor is willing to spend. Alternatively, the available shares are allocated based on the investor score in any suitable fashion that enables isolated node layer 300 to function as described herein.

In some embodiments, the shares allocated by layer allocation module 308 to each node 302 are added to the predetermined base number of shares allocated by upstream model layer 250 to arrive at the allocation represented by data signal 310. In other embodiments, the predetermined base number of shares is first subsumed back into the total number of available shares by layer allocation module 308, and the shares allocated by layer allocation module 308 represent the complete allocation to each candidate investor in data signal 310. In the example embodiment, however, whole shares allocated to a particular investor by isolated node layer 300 may be subject to fractional reallocation to another investor in a downstream model layer 202, as will be described below.

In the example embodiment, optimization module 312 is further programmed to evaluate a data quality of the allocation of shares represented by data signal 310. For example, optimization module 312 checks for outlier share allocations, in which an allocation to one or more candidate investors exceeds a predetermined threshold statistical deviation relative to the overall distribution of shares. In some circumstances, optimization module 312 may cure the outlier allocation locally (i.e., within optimization module 312), e.g. by re-allocating shares among the candidate investors to cure the deviation. In other circumstances, optimization module 312 may respond to the outlier allocation by triggering a re-training of the machine learning model to refine the set of weights 304, and then instructing isolated node layer 300 to re-apply the refined set of weights 304 to vector 301 of input data signal 201 for each respective candidate investor node 302 to arrive at updated investor scores. After optimization module 312 causes any applicable corrections, optimization module 312 outputs model layer output 204 of isolated node layer 300, designated isolated-node model layer output 314, which includes data representative of the allocation of shares (in blocks of whole shares) to each candidate investor represented by a node 302. Alternatively, optimization module 312 is not programmed to evaluate the data quality of the allocation of shares represented by data signal 310. For example, isolated node layer 300 passes the allocation of shares represented by data signal 310 directly to model layer output 314.

In some embodiments, model layer output 314 further includes the investor scores for each candidate investor.

In some embodiments, layer allocation module 308 is programmed to allocate all of the shares that were identified as available for further allocation in layer output 204 received from the upstream model layer 202. In other embodiments, layer allocation module 308 reserves a portion of the available shares for initial allocation in a downstream model layer 202. In embodiments in which a portion of the available shares is reserved, isolated node layer 300 includes the number of reserved shares in layer model output 314.

Figure 4:
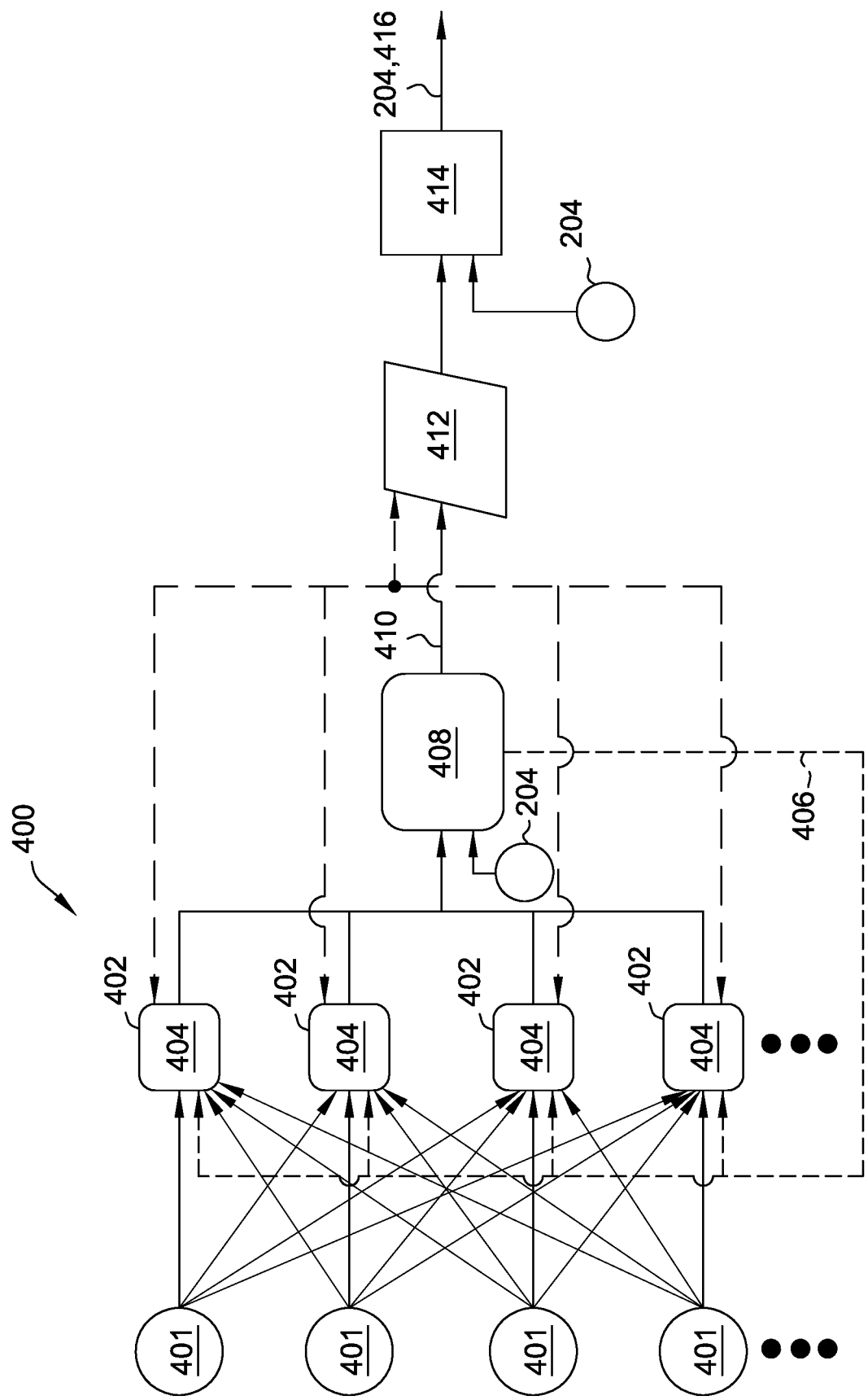
FIG. 4 is a schematic block diagram illustrating an example fractional node layer that may be implemented as one of the plurality of computational layers shown in FIG. 2.

FIG. 4 is a schematic block diagram illustrating an example implementation of one of model layers 202 as a fractional node layer 400. In the example embodiment, fractional node layer 400 is implemented as final model layer 254, directly downstream from intermediate model layer 252 implemented as isolated node layer 300, and indirectly downstream from the first model layer 250 implemented as the qualification model layer. Alternatively, fractional node layer 400 is implemented at any suitable upstream or downstream model layer 202.

Fractional node layer 400 identifies, from the received model layer output 204 from the immediately upstream layer 202, a subset of candidate investors that are associated with a respective broker-dealer computing device 104 that supports trading of fractional shares, and assigns each candidate investor in the subset to a node 402 in fractional node layer 400. In the example embodiment, candidate investors included in model layer output 314 from isolated node layer 300 are identified, and then the broker-dealer computing device 104 associated with each of the initially identified candidate investors is reviewed to determine whether the associated broker-dealer supports trading of fractional shares. If the associated broker-dealer does not support the allocation of fractional shares to its investor clients, then the potential candidate investors who participate through that broker-dealer computing device 104 are filtered out from participation in fractional node layer 400, leaving only the subset of candidate investors for assignment to nodes 402.

As noted above, in some embodiments, an inability of a respective broker-dealer computing device 104 to support fractional shares is implemented as a bias factor in isolated node layer 300 that tends to reduce an allocation of whole shares to candidate investors associated with that broker-dealer. In some embodiments, this preemptive upstream allocation reduction (e.g., a one-share reduction) provides advantages such as (i) ensuring that candidate investors who "lose" a fraction of a share in fractional node layer 400 (as described further below) are treated no worse than candidate investors who did not compete at all for fractional shares, and/or (ii) enabling the additional optimization provided by fractional node layer 400 to operate on a greater portion of the overall allocation.

Nodes 402 may be viewed as neurons that define a fully connected neural network implemented by fractional node layer 400. Each node 402 receives, as an input, a fitness value 401 associated with the corresponding candidate investor. In addition, each node 402 is associated with a weight 404 (e.g., and/or bias) that directly represents an addition of a fractional share to, or potentially in some embodiments the subtraction of a fractional share from, the whole share allocation received from the upstream model layer 202 for the corresponding candidate investor. In the example embodiment, the weights 404 are initially set to zero, i.e., nodes 402 begin the adjustment process in fractional node layer 400 on an equal footing. Weights 404 are then adjusted by applying a suitable machine learning algorithm on the neural network, and the final weights 404 correspond directly to fractions of a share added to (or, potentially, subtracted from) the allocation of shares to the candidate investor associated with the respective node 402.

In some embodiments, an absolute value of each weight 404 is constrained to lie between zero and one (inclusive). In embodiments in which a portion of the available shares is reserved for allocation in fractional node layer 400, the weight 404 for each node 402 is constrained to be a real value between zero and positive one, and nodes 402 compete against each other to accumulate the largest weight (which corresponds to the largest fractional share allocation). For example, the number of reserved shares is selected in the upstream model layer 252 based on the number of candidate investors associated with broker-dealer computing devices 104 that support fractional shares trading (i.e., the number of candidate investors that will be competing for fractional shares). Alternatively, in embodiments in which all available shares are provisionally allocated in the upstream model layer 252, the weight 404 for each node 402 is constrained to be a real value between negative one and positive one (inclusive), and nodes 402 compete against each other in a zero-sum competition to accumulate the largest weight (which corresponds to the largest fractional share allocation) and/or avoid losing shares via a negative final weight 404.

For example, fractional node layer 400 includes an optimization module 408 programmed to award fractional shares to (i.e., to increase weights 404 of) nodes 402 associated with the candidate investors in the subset that demonstrate a relatively higher relative fitness value 401. Again, it should be understood that terms such as "optimization" and "optimize" in this context need not refer to a deterministic single best or "optimal" solution for weights 404, but rather to a solution for weights 404 that tends to reduce a loss function relative to the allocation of shares received in model layer output 204 from the upstream model layer 252.

In some embodiments, the fitness value 401 is received in, or otherwise derived from, the model layer output 204 of upstream layer 252. As discussed above, the fitness value 401 may correspond, for example, to the predicted time that each share allocated to the candidate investor will be held before the share is traded in the aftermarket. For example, the fitness value 401 input to each node 402 may be derived from, or calculated in a similar fashion to, the investor score associated with the same candidate investor in isolated node layer 300, based on vector 301 for the candidate investor and the set of weights 304 from isolated node layer 300. A suitable algorithm, represented schematically by dashed line 406, is then applied to adjust weights 404 to reward nodes 402 with relatively higher fitness values 401, under the constraint that a purchase price of the resulting total allocation (including weight 404) of shares to the candidate investor associated with a respective node 402 cannot exceed the amount stated in the request data by the candidate investor as willing to spend.

In some such embodiments, optimization module 408 utilizes a heuristic algorithm, such as a "greedy" algorithm, in which nodes 402 are assigned to groups and the nodes 402 within each group compete against each other, with the weight 404 of one or more of the most relatively fit nodes in the group being adjusted upward, subject to the price constraint noted above. In zero-sum implementations, the increase in weight 404 for the one or more relatively most fit nodes may be accompanied by a decrease in weight 404 for one or more relatively least fit nodes in the group. The greedy algorithm may be iterated a number of times with random or algorithmically defined re-groupings of nodes 402. In some embodiments, the iterations may be stopped dynamically in response to weights 404 for a suitable number of nodes 402 converging at a stable value across iterations, as defined by a suitable stability threshold. Additionally or alternatively, the number of iterations may be capped at a suitable predefined value.

In alternative embodiments, optimization module 408 utilizes any suitable algorithm that enables fractional node layer 400 to function as described herein.

Accordingly, in certain embodiments, the architecture of fractional node layer 400 causes nodes 402 associated with candidate investors that exhibit a relatively better predicted post-offering behavior preferred by issuer computing device 106 (as predicted by deep, hidden connections among characteristics of the corresponding candidate investors, e.g. as discovered by the neural network in isolated node layer 300) to advantageously attract larger allocations of fractional shares, relative to other nodes 402.

In the example embodiment, fractional node layer 400 also includes a normalization module 412 configured to translate weights 404 into fractional share allocations. In some embodiments, after the machine-learning algorithm implemented by optimization module 408 arrives at a final value for weights 404 for each node 402, optimization module 408 transmits an output 410 that includes the final weight 404 (i.e., a real value between zero and one or, alternatively, a real value between negative one and positive one) for each node 402. In some embodiments, normalization module 412 converts weights 404 to corresponding fractional values using a selected base denominator (for example, quarters, eighths, or sixteenths), rounding the real values as necessary to generate simple fractions having the selected base denominator. Normalization module 412 is also configured to adjust fractions for one or more nodes 402 as necessary to ensure that the purchase price constraint remains satisfied.

In the example embodiment, fractional node layer 400 also includes a final allocation module 414 that receives the normalized fractional share allocations from normalization module 412 and computes the model layer output 204 of normalization module 412, designated fractional-node model layer output 416, which includes data representative of the allocation of shares to all candidate investors that passed the minimum requirements filter embodied in model layer 250. More specifically, for candidate investors represented by nodes 402, final allocation module 414 adds (or, potentially, subtracts) the fractional share allocation for the respective node 402, received from normalization module 412, to the whole share allocation received for the respective candidate investor in the model layer output 204 from the upstream model layer 202 (in the example embodiment, isolated-node model layer output 314), to arrive at a final allocation that includes fractional shares for most or all candidate investors represented by nodes 402. (It should be understood that in some circumstances, at least one node 402 may receive a final weight 404 of zero during execution of optimization module 408, in which case the corresponding candidate investor would end with a whole share allocation despite competing for fractional shares.) In addition, for candidate investors represented in the model layer output 204 from the upstream model layer 202 (in the example embodiment, isolated-node model layer output 314) but not represented by nodes 402 (e.g., candidate investors associated with broker-dealer computing devices 104 that do not support trading of fractional shares), final allocation module 414 passes through the whole share allocation received for the respective candidate investor in the model layer output 204 from the upstream model layer 252. Accordingly, in the example embodiment, fractional-node model layer output 416 includes share allocations for all candidate investors that passed the minimum requirements filter embodied in model layer 250, with fractional share allocations for a subset of candidate investors represented by nodes 402 and whole share allocations for the other candidate investors.

Alternatively, final allocation module 414 arrives at share allocation values for candidate investors in any suitable fashion.

In some embodiments, final allocation module 414 also identifies a number of unallocated fractions of shares after the final share allocation is generated. Final allocation module 414 assigns the unallocated shares to one or more buckets that enables after-market trades by candidate investors who received a fractional portion of a share. More specifically, when an investor computing device 102 sends a signal requesting an after-market trade of a fraction of a share, a complementary fraction of a share is drawn from the bucket to enable a trade of a whole share. In some such embodiments, final allocation module 414 allocates to each broker-dealer computing device 104 a respective bucket of fractional shares proportional to the fractional shares allocated to candidate investors associated with that broker-dealer computing device 104, and the broker-dealer computing device 104 provides the complementary fraction of a share directly when one of its candidate investors performs an after-market trade of a fractional share. Additionally or alternatively, SA computing device 108 retains a bucket of fractional shares, and sells complementary fractions of a share from the bucket to broker-dealer computing devices 104 as needed to enable the respective broker-dealer computing device 104 to complete fractional share trades initiated by respective investor computing devices 102.

As noted above, in cases where final notice from issuer computing device 106 of the actual number of shares available has not yet been received when model 200 is executed, adjustments to the allocation in fractional-node model layer output 416 may be made when the actual number of shares available for allocation by SA computing device 108 is determined. In some such cases, the adjustment includes a pro rata adjustment, and may include fractional share adjustments for candidate investors represented by nodes 402 as appropriate. Additionally or alternatively, the adjustment includes a subtraction of whole shares from candidate investors not represented by nodes 402, as appropriate.

Certain contrasts between isolated node model layer 300 and fractional node layer 400 may be noted. In some embodiments, as explained above, isolated node model layer 300 applies one or more machine learning algorithms periodically to historical investor and request data and corresponding actual outcome data to tune a set of node weights 304, and then applies that tuned set of weights 304 to input vectors 301 for all minimally qualified candidate investors to arrive at a model layer share allocation to candidate investors for a current offering. In contrast, fractional node layer 400 executes a machine learning algorithm specifically in response to each current offering, and the resultant node weights 404 themselves represent further share allocations, in positive (or, potentially in some embodiments, negative) fractions of a share.

In addition, while nodes 302 of isolated node model layer are "isolated" as discussed previously, nodes 402 of fractional node layer 400 are interconnected. While applying the machine learning algorithm to nodes 402 that are interconnected may cause a relative increase in the processing load imposed on SA computing device 108, this computational load is mitigated by the fact that the node weights 404 themselves represent the model layer allocation, eliminating computational steps that would otherwise be required to convert input vectors and generically trained node weights to allocation values. Moreover, the computational load is further mitigated in embodiments in which optimization module 408 utilizes a "greedy" or other heuristic algorithm, as such algorithms are characterized by fewer computational steps and, thus, a relatively lower processing load as compared to dynamic programming algorithms that search for a single "best" or "optimal" solution. The computational load imposed by the interconnected nodes 402 is further mitigated in at least some embodiments because the optimizations already performed in upstream model layers 202, which are designed to be relatively less computationally burdensome, do not need to be repeated in the interconnected node architecture. The computational load imposed by the interconnected nodes 402 is still further mitigated in at least some applications because the number of nodes 402 is smaller than the number of nodes 302 (i.e., the subset of candidate investors associated with broker-dealer computing devices 104 that support fractional shares trading is smaller than the number of candidate investors that pass the minimum requirements filter embodied in model layer 250).

For any or all of the above reasons, a sequence of model layers 202 as described herein, including fractional node layer 400 in a downstream model layer 254, provides advantages in solving the complex computational processing challenges inherent in discovering and utilizing the hidden or latent knowledge within the input data set formed by the characteristics and historical share transactions of hundreds, thousands, tens of thousands, or even millions of candidate investors to enable improved allocations at the level of fractions of a share.

Figure 5:
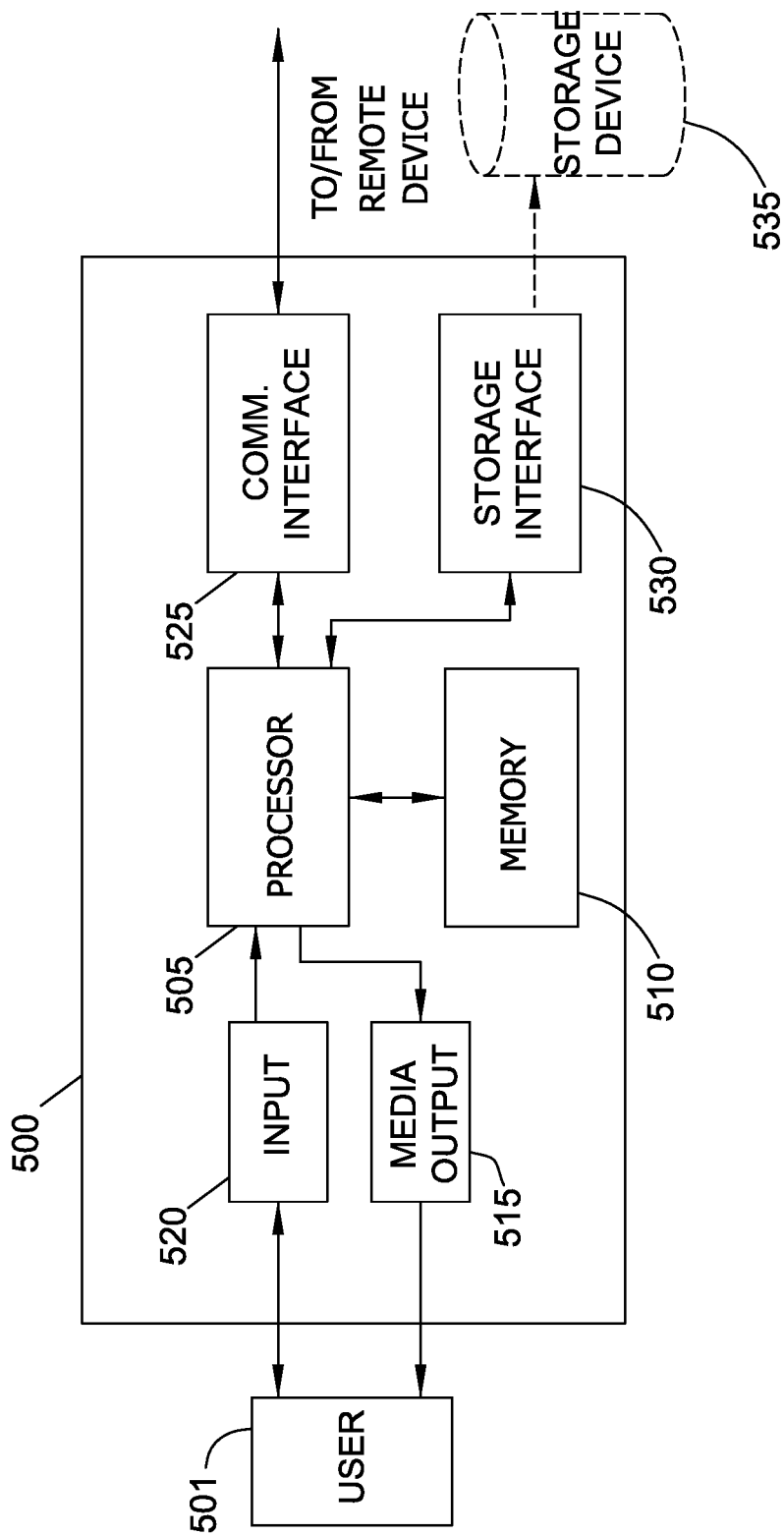
FIG. 5 is an example configuration of a client system that may be used to implement the investor computing devices, broker-dealer computing devices, and/or issuer computing device shown in FIG. 1 in accordance with embodiments of the present disclosure.

FIG. 5 is an example configuration of a client system 500 that may be used to implement investor computing devices 102, issuer computing device 106, and/or broker-dealer computing device 104 in accordance with embodiments of the present disclosure. In the example embodiment, client system 500 is operable by a user 501, such as a candidate investor, a broker-dealer, or an issuer. Client system 500 includes a processor 505 for executing instructions stored in a memory area 510. Processor 505 may, for example, include one or more processing units (e.g., in a multi-core configuration). Memory area 510 may, for example, be any device allowing information, such as executable instructions, to be stored and retrieved. Memory area 510 may further include one or more computer readable media. Processor 505 executes computer-executable instructions for implementing aspects of the disclosure. In some embodiments, the processor 505 is transformed into a special purpose microprocessor by executing computer-executable instructions or by otherwise being programmed.

In the example embodiment, processor 505 is also operatively coupled to a storage device 535, which may be, for example, any computer-operated hardware unit suitable for storing and/or retrieving data. Storage device 535 may be used, for example by client system 500 implemented as broker-dealer computing device 104, to store historical investor data associated with investors who participate in offerings and after-market trading via the respective broker-dealer computing device 104. Storage device 535 may also be used, for example by client system 500 implemented as issuer computing device 106, to store data defining a current offering.

In some embodiments, storage device 535 is integrated in client system 500. For example, client system 500 may include one or more hard disk drives as storage device 535. In other embodiments, storage device 535 is external to client system 500 and may be accessed by a plurality of client systems 500. For example, storage device 535 may include multiple storage units such as hard disks or solid state disks in a redundant array of inexpensive disks (RAID) configuration. Storage device 535 may include a storage area network (SAN) and/or a network attached storage (NAS) system.

In some embodiments, processor 505 is operatively coupled to storage device 535 via a storage interface 530. Storage interface 530 may include, for example, a component capable of providing processor 505 with access to storage device 535. In an exemplary embodiment, storage interface 530 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 505 with access to storage device 535.

In the example embodiment, client system 500 further includes at least one media output component 515 for presenting information to user 501. Media output component 515 may, for example, be any component capable of converting and conveying electronic information to user 501. For example, media output component 515 may be a display component configured to display offer data and/or historical investor data in the form of reports, dashboards, communications, and the like In some embodiments, media output component 515 includes an output adapter (not shown), such as a video adapter and/or an audio adapter, which is operatively coupled to processor 505 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 is configured to include and present a graphical user interface (not shown), such as a web browser and/or at least one client application, to user 501. The graphical user interface may include, for example, an interface for viewing and/or responding to offers or other information presented through SA computing device 108. In some embodiments, client system 500 includes an input device 520 for receiving input from user 501. For example, for client system 500 implemented as investor computing device 102, user 501 may use input device 520 to, without limitation, select and view offers from SA computing device 108, submit a share and/or purchase request to SA computing device 108, access log-in credential information, and/or submit payment information.

For another example, for client system 500 implemented as broker-dealer computing device 104, user 501 may use input device 520 to, without limitation, access log-in credential information, view permissions from investor computing devices 102 to communicate information to SA computing device 108, and/or select historical investor data for transmission to SA computing device 108. For another example, for client system 500 implemented as issuer computing device 106, user 501 may use input device 520 to, without limitation, access log-in credential information, view and select offer data for transmission to SA computing device 108, and/or view and select an aggregate share purchase request for a current offer submitted by SA computing device 108 on behalf of a plurality of candidate investors.

Input device 520 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, an iris reader/scanner, a retina reader/scanner, a profile scanner, or the like. A single component such as a touch screen may function as both an output device of media output component 515 and input device 520. Client system 500 may also include a communication interface 525, which is communicatively connectable to a remote device such as SA computing device 108 (shown in FIG. 1) or another client system 500. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer readable instructions for providing a user interface to user 501 via media output component 515 and, optionally, receiving and processing input from input device 520. A user interface may include, among other possibilities, a web browser, and at least one client application. Web browsers enable users, such as user 501, to display and interact with media and other information typically embedded on a web page or a website from SA computing device 108. A client application allows user 501 to interact with a server application from SA computing device 108. For example, instructions may be stored by a cloud service, and the output of the execution of the instructions sent to the media output component 515.

Figure 6:
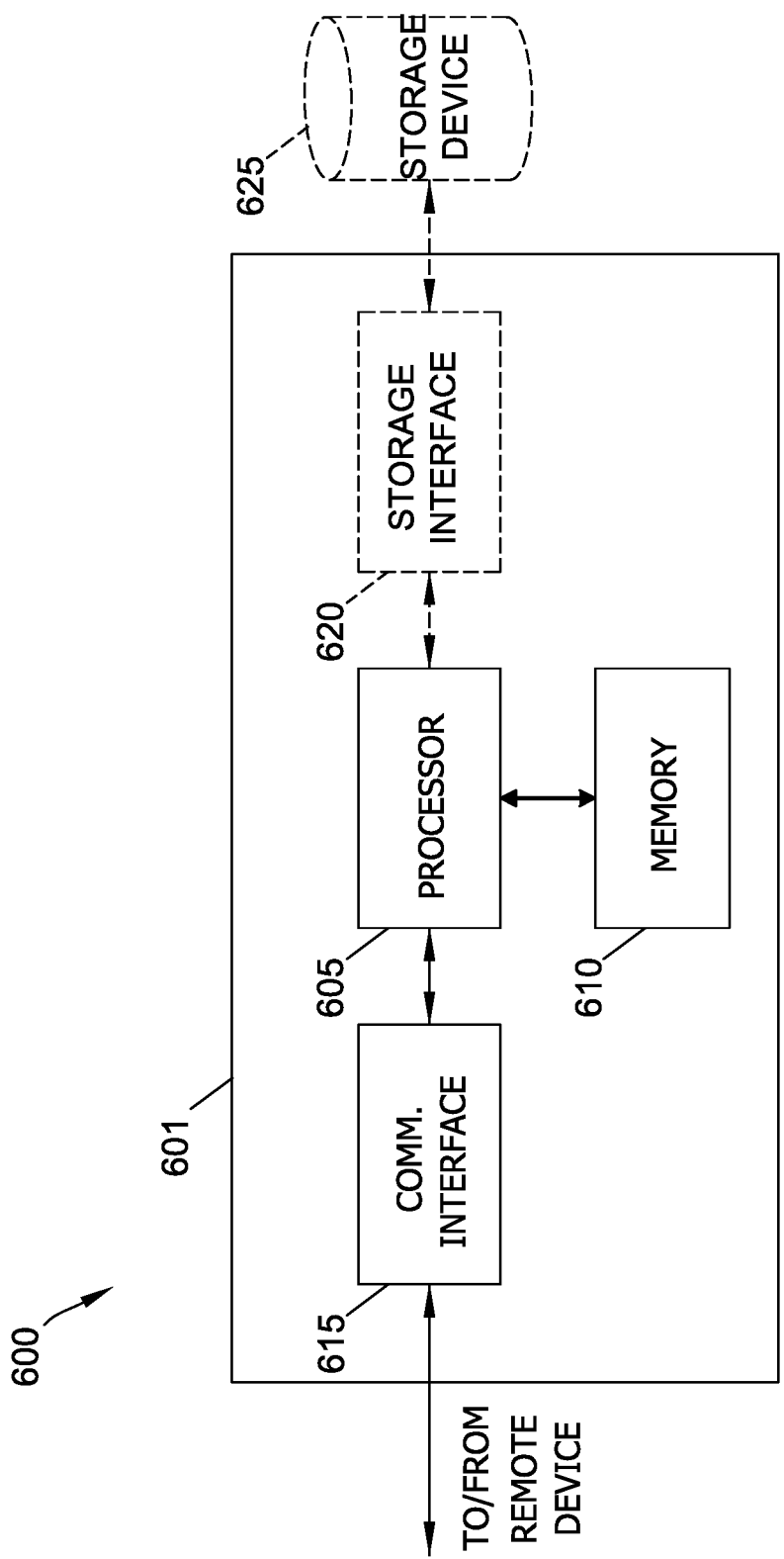
FIG. 6 is an example configuration of a server system that may be used to implement the share allocation computing device shown in FIG. 1 in accordance with embodiments of the present disclosure.

FIG. 6 illustrates an example configuration of a server system 600 that may be used to implement SA computing device 108. In the example embodiment, server system 600 includes one or more server computing devices 601 in electronic communication with at least one storage device 625. In the exemplary embodiment, each server computing device 601 includes a processor 605 for executing instructions stored in a memory area 610. In some embodiments, processor 605 includes one or more processing units (e.g., in a multi-core configuration) for executing instructions. The instructions may be executed within various different operating systems on the server system 600, such as UNIX®, LINUX® (LINUX is a registered trademark of Linus Torvalds), Microsoft Windows®, etc. More specifically, the instructions may cause various data manipulations on data stored in storage device 625 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, JSDA, or other suitable programming languages, etc.).

In the example embodiment, processor 605 is operatively coupled to a communication interface 615 such that server system 600 is capable of communicating with remote devices such as investor computing devices 102, issuer computing device 106, and/or broker-dealer computing devices 104. For example, communication interface 615 may receive requests from remote devices via the Internet.

In the example embodiment, processor 605 is also operatively coupled to a storage device 625, which may be, for example, any computer-operated hardware unit suitable for storing and/or retrieving data. Storage device 625 is used, for example, to store historical investor data, offer data received from issuer computing device 106, and request data received from investor computing devices 102. In some embodiments, storage device 625 is integrated into the one or more server computing devices 601. For example, at least one server computing device 601 may include one or more hard disk drives as storage device 625. In other embodiments, storage device 625 is external to server system 600 and may be accessed by a plurality of server systems 600. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some embodiments, processor 605 is operatively coupled to storage device 625 via a storage interface 620. Storage interface 620 may include, for example, a component capable of providing processor 605 with access to storage device 625. In an exemplary embodiment, storage interface 620 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 605 with access to storage device 625.

Memory area 610 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program. Stored in memory area 610 are, for example, computer readable instructions for implementing the functionality described above with respect to SA computing device 108 and computational model 200.

Figure 7A:
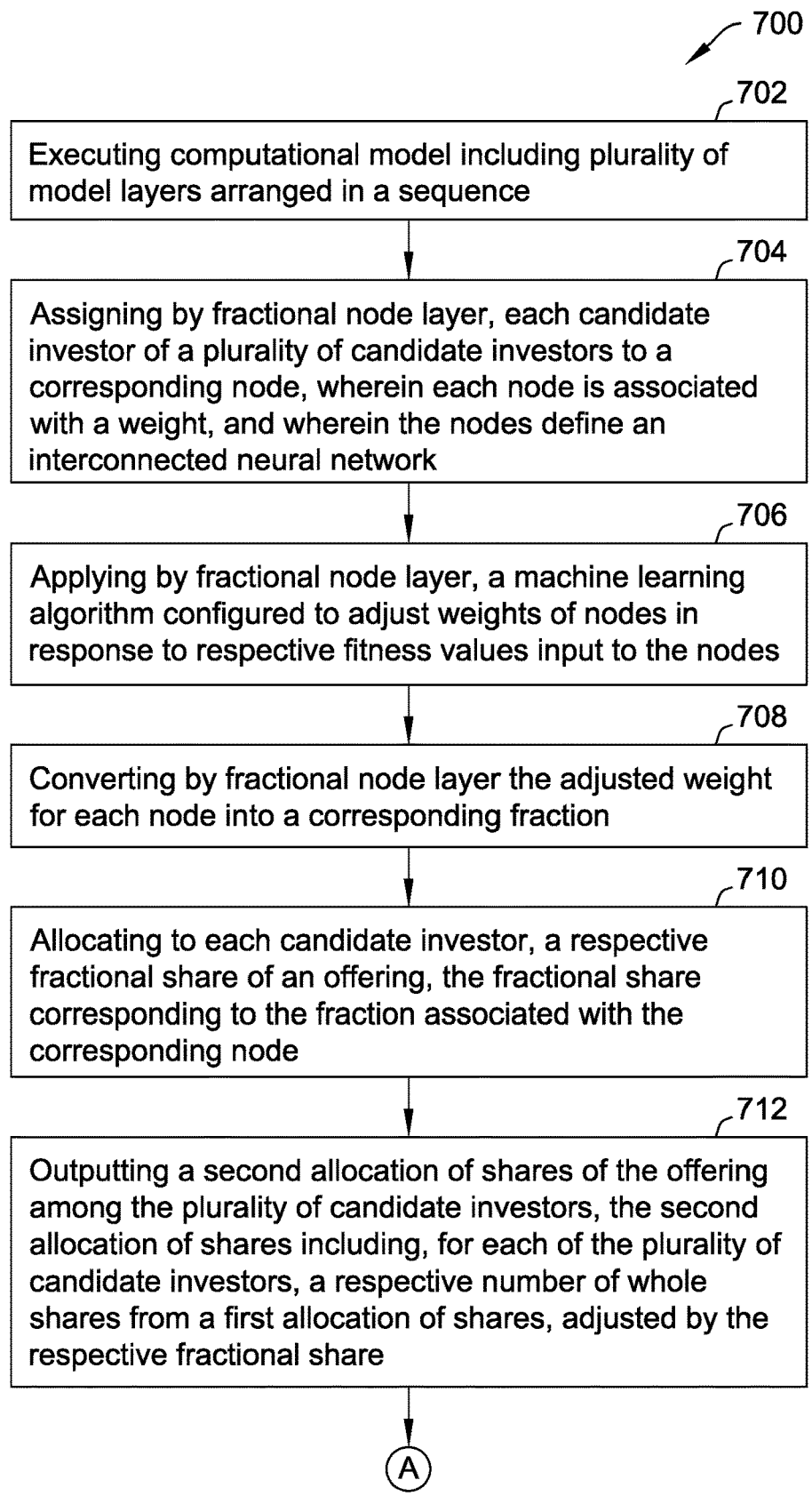
FIG. 7A is a portion of a flow diagram illustrating an example process that may be implemented by the share allocation computing device shown in FIG. 1.
Figure 7B:
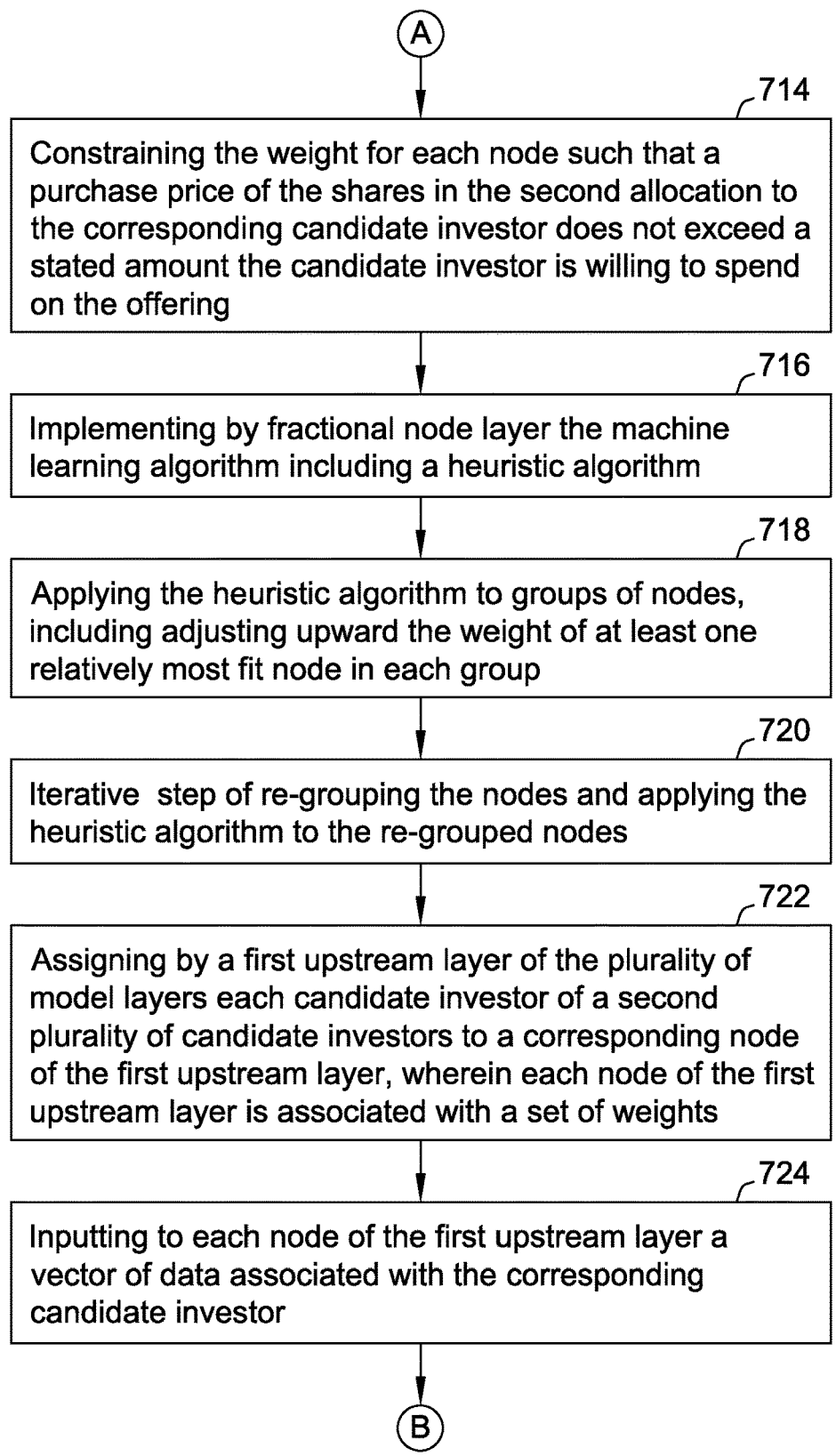
FIG. 7B is a second portion of the flow diagram of FIG. 7A.
Figure 7C:
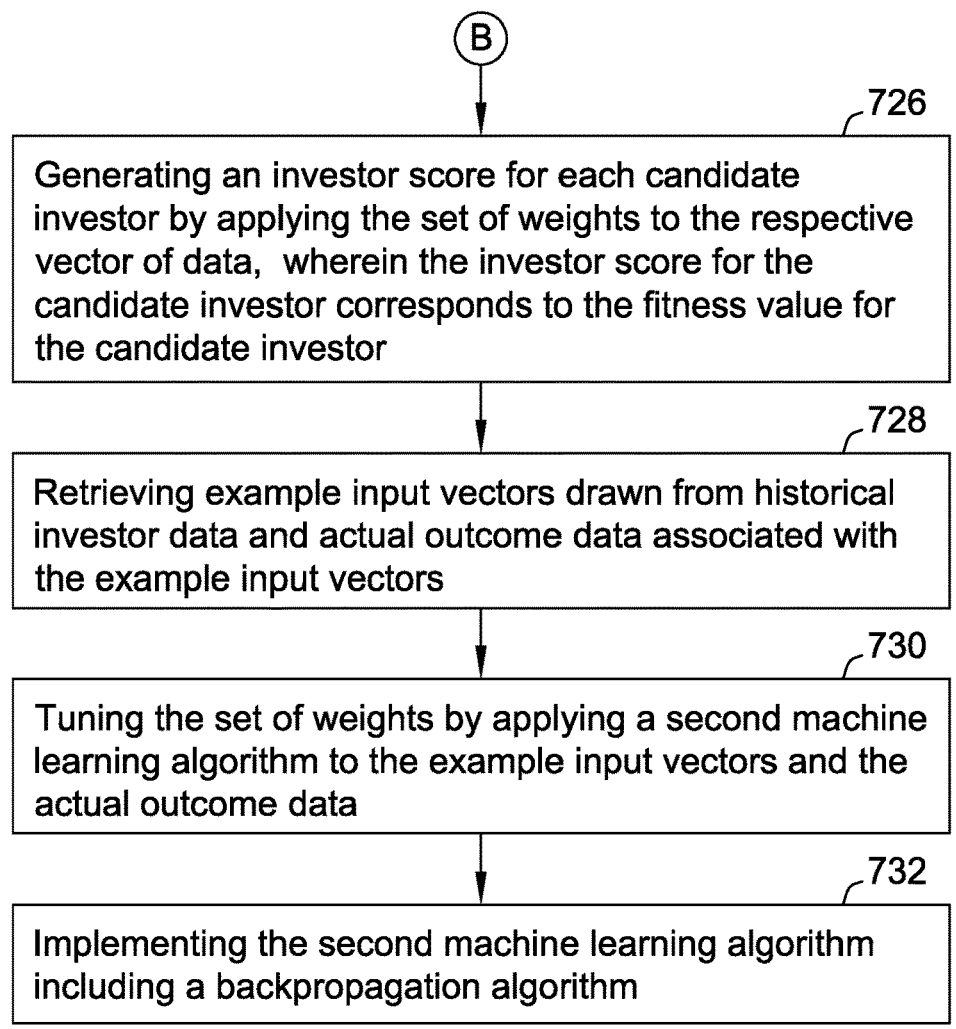
FIG. 7C is a third portion of the flow diagram of FIGS. 7A and 7B.

FIGS. 7A, 7B, and 7C are a flow diagram illustrating steps that may be included in an example process 700 implemented by SA computing device 108.

In some embodiments, process 700 includes executing 702 computational model 200 including plurality of model layers 202 arranged in a sequence.

In certain embodiments, process 700 includes assigning 704, by fractional node layer 400, each candidate investor of a plurality of candidate investors to a corresponding node 402, wherein each node 402 is associated with a weight 404, and wherein the nodes 402 define an interconnected neural network.

In some embodiments, process 700 includes applying 706, by fractional node layer 400, a machine learning algorithm configured to adjust weights 404 of nodes 402 in response to respective fitness values 401 input to the nodes.

In certain embodiments, process 700 includes converting 708, by fractional node layer 400, the adjusted weight 404 for each node 402 into a corresponding fraction.

In some embodiments, process 700 includes allocating 710, to each candidate investor, a respective fractional share of an offering, the fractional share corresponding to the fraction associated with the corresponding node 402.

In certain embodiments, process 700 includes outputting 712 a second allocation of shares of the offering among the plurality of candidate investors, the second allocation of shares including, for each of the plurality of candidate investors, a respective number of whole shares from a first allocation of shares, adjusted by the respective fractional share.

In some embodiments, process 700 includes constraining 714 the weight 404 for each node 402 such that a purchase price of the shares in the second allocation to the corresponding candidate investor does not exceed a stated amount the candidate investor is willing to spend on the offering.

In certain embodiments, process 700 includes implementing 716, by fractional node layer 400, the machine learning algorithm including a heuristic algorithm.

In some embodiments, process 700 includes applying 718 the heuristic algorithm to groups of nodes, including adjusting upward the weight of at least one relatively most fit node in each group.

In certain embodiments, process 700 includes an iterative step 720 of re-grouping the nodes and applying the heuristic algorithm to the re-grouped nodes.

In some embodiments, process 700 includes assigning 722, by a first upstream layer (e.g., model layer 252 implemented as isolated node layer 300) of the plurality of model layers 202, each candidate investor of a second plurality of candidate investors to a corresponding node 302 of the first upstream layer, wherein each node of the first upstream layer is associated with a set of weights 304.

In certain embodiments, process 700 includes inputting 724 to each node 302 of the first upstream layer a vector 301 of data associated with the corresponding candidate investor.

In some embodiments, process 700 includes generating 726 an investor score for each candidate investor by applying the set of weights 304 to the respective vector 301 of data, wherein the investor score for the candidate investor corresponds to the fitness value 401 for the candidate investor.

In certain embodiments, process 700 includes retrieving 728 example input vectors drawn from historical investor data and actual outcome data associated with the example input vectors, and tuning 730 the set of weights by applying a second machine learning algorithm to the example input vectors and the actual outcome data.

In some embodiments, process 700 includes implementing 732 the second machine learning algorithm including a backpropagation algorithm.

Additionally or alternatively, process 700 includes other steps consistent with the functionality of SA computing device 108 and computational model 200 as described herein.

It should be understood that the ordering of steps as shown in FIGS. 7A-7C is non-limiting to embodiments of process 700.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of investor scoring. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A share allocation (SA) computing device comprising at least one processor in communication with a database, the at least one processor configured to execute a computational model including a plurality of model layers arranged in a sequence, wherein the plurality of model layers includes a fractional node layer configured to:
   assign each candidate investor of a plurality of candidate investors to a corresponding node in the fractional node layer, wherein each node is associated with a weight, and wherein the nodes define an interconnected neural network;
   apply a machine learning algorithm comprising a heuristic algorithm to the interconnected neural network, wherein the machine learning algorithm is configured to adjust the weights of the nodes in response to respective fitness values input to the nodes by:

assigning the nodes to groups;
applying the heuristic algorithm, comprising adjusting upward the weight of at least one relatively most fit node in each group;
iteratively re-grouping the nodes and applying the heuristic algorithm to the re-grouped nodes; and
outputting an adjusted weight for each node based on the iterative re-grouping and the heuristic algorithm;
convert the adjusted weight for each node into a corresponding fraction; and
allocate, to each candidate investor, a respective fractional share of an offering, the fractional share corresponding to the fraction associated with the corresponding node.

2. The SA computing device of claim 1, wherein the fractional node layer is further configured to:
receive an input identifying a first allocation of shares of the offering among the plurality of candidate investors, the first allocation of shares including a respective number of whole shares allocated to each of the candidate investors; and
output a second allocation of shares of the offering among the plurality of candidate investors, the second allocation of shares including, for each of the plurality of candidate investors, the respective number of whole shares from the first allocation of shares adjusted by the respective fractional share.

3. The SA computing device of claim 2, wherein the fractional node layer is further configured to:
access request data for each candidate investor indicating a stated amount the candidate investor is willing to spend on the offering; and
constrain the weight for each node such that a purchase price of the shares in the second allocation to the corresponding candidate investor does not exceed the stated amount.

4. The SA computing device of claim 1, wherein the plurality of candidate investors is a subset of a second plurality of candidate investors, and the fractional node layer is further configured to:
receive an input identifying the second plurality of candidate investors; and
select, for assignment to the corresponding nodes, the subset of candidate investors from among the second plurality of candidate investors.

5. The SA computing device of claim 1, wherein the plurality of model layers further includes a first upstream layer, and wherein the fractional node layer is further configured to derive the respective fitness values from a model layer output of the first upstream layer.

6. The SA computing device of claim 5, wherein the plurality of candidate investors is a subset of a second plurality of candidate investors, and wherein the first upstream layer is configured to:
assign each candidate investor of the second plurality of candidate investors to a corresponding node of the first upstream layer, wherein each node of the first upstream layer is associated with a set of weights;
input to each node of the first upstream layer a vector of data associated with the corresponding candidate investor; and
generate an investor score for each candidate investor by applying the set of weights to the respective vector of data, wherein the investor score for the candidate investor corresponds to the fitness value for the candidate investor.

7. The SA computing device of claim 6, wherein the first upstream layer is further configured to:

retrieve example input vectors drawn from historical investor data and actual outcome data associated with the example input vectors; and
prior to inputting to each node of the first upstream layer the vector of data associated with the corresponding candidate investor, tune the set of weights by applying a second machine learning algorithm to the example input vectors and the actual outcome data.

8. The SA computing device of claim 7, wherein the first upstream layer is further configured to:
implement the second machine learning algorithm including a backpropagation algorithm.

9. A computer-implemented method, said method implemented by a share allocation (SA) computing device comprising at least one processor in communication with a database, said method comprising:
executing, by the at least one processor, a computational model including a plurality of model layers arranged in a sequence, the plurality of model layers including a fractional node layer;
assigning, by the fractional node layer, each candidate investor of a plurality of candidate investors to a corresponding node in the fractional node layer, wherein each node is associated with a weight, and wherein the nodes define an interconnected neural network;
applying, by the fractional node layer, a machine learning algorithm comprising a heuristic algorithm to the interconnected neural network, wherein the machine learning algorithm is configured to adjust the weights of the nodes in response to respective fitness values input to the nodes by:
assigning the nodes to groups;
applying the heuristic algorithm, comprising adjusting upward the weight of at least one relatively most fit node in each group;
iteratively re-grouping the nodes and applying the heuristic algorithm to the re-grouped nodes; and
outputting an adjusted weight for each node based on the iterative re-grouping and the heuristic algorithm;
converting, by the fractional node layer, the adjusted weight for each node into a corresponding fraction; and
allocating, to each candidate investor, a respective fractional share of an offering, the fractional share corresponding to the fraction associated with the corresponding node.

10. The method of claim 9, further comprising:
receiving, by the fractional node layer, an input identifying a first allocation of shares of the offering among the plurality of candidate investors, the first allocation of shares including a respective number of whole shares allocated to each of the candidate investors;
calculating, by the fractional node layer, a second allocation of shares of the offering among the plurality of candidate investors, the second allocation of shares including, for each of the plurality of candidate investors, the respective number of whole shares from the first allocation of shares adjusted by the respective fractional share;
accessing, by the fractional node layer, request data for each candidate investor indicating a stated amount the candidate investor is willing to spend on the offering; and
constraining, by the fractional node layer, the weight for each node such that a purchase price of the shares in the second allocation to the corresponding candidate investor does not exceed the stated amount.

11. The method of claim 9, wherein the plurality of model layers further includes a first upstream layer, the method further comprising:
deriving, by the fractional node layer, the respective fitness values from a model layer output of the first upstream layer.

12. The method of claim 11, wherein the plurality of candidate investors is a subset of a second plurality of candidate investors, the method further comprising:
assigning, by the first upstream layer, each candidate investor of the second plurality of candidate investors to a corresponding node of the first upstream layer, wherein each node of the first upstream layer is associated with a set of weights;
inputting, by the first upstream layer to each node of the first upstream layer, a vector of data associated with the corresponding candidate investor; and
generating, by the first upstream layer, an investor score for each candidate investor by applying the set of weights to the respective vector of data, wherein the investor score for the candidate investor corresponds to the fitness value for the candidate investor.

13. At least one non-transitory computer-readable storage media having computer-executable instructions embodied thereon, wherein when executed by a share allocation (SA) computing device comprising at least one processor in communication with a database, the computer-executable instructions cause the at least one processor to:
execute a computational model including a plurality of model layers arranged in a sequence, the plurality of model layers including a fractional node layer;
assign, by the fractional node layer, each candidate investor of a plurality of candidate investors to a corresponding node in the fractional node layer, wherein each node is associated with a weight, and wherein the nodes define an interconnected neural network;
apply, by the fractional node layer, a machine learning algorithm comprising a heuristic algorithm to the interconnected neural network, wherein the machine learning algorithm is configured to adjust the weights of the nodes in response to respective fitness values input to the nodes by:
assigning the nodes to groups;
applying the heuristic algorithm, comprising adjusting upward the weight of at least one relatively most fit node in each group;
iteratively re-grouping the nodes and applying the heuristic algorithm to the re-grouped nodes; and
outputting an adjusted weight for each node based on the iterative re-grouping and the heuristic algorithm;
convert, by the fractional node layer, the adjusted weight for each node into a corresponding fraction; and
allocate, by the fractional node layer to each candidate investor, a respective fractional share of an offering, the fractional share corresponding to the fraction associated with the corresponding node.

14. The at least one non-transitory computer-readable storage media of claim 13, wherein the plurality of model layers further includes a first upstream layer, wherein the plurality of candidate investors is a subset of a second plurality of candidate investors, and wherein the instructions further cause the at least one processor to:
assign, by the first upstream layer, each candidate investor of the second plurality of candidate investors to a corresponding node of the first upstream layer, wherein each node of the first upstream layer is associated with a set of weights;
input, by the first upstream layer to each node of the first upstream layer, a vector of data associated with the corresponding candidate investor; and
generate, by the first upstream layer, an investor score for each candidate investor by applying the set of weights to the respective vector of data, wherein the investor score for the candidate investor corresponds to the fitness value for the candidate investor.

15. The at least one non-transitory computer-readable storage media of claim 14, wherein the instructions further cause the at least one processor to:
retrieve, by the first upstream layer, example input vectors drawn from historical investor data and actual outcome data associated with the example input vectors; and
prior to inputting to each node of the first upstream layer the vector of data associated with the corresponding candidate investor, tune, by the first upstream layer, the set of weights by applying a second machine learning algorithm to the example input vectors and the actual outcome data.

16. The at least one non-transitory computer-readable storage media of claim 15, wherein the instructions further cause the at least one processor to:
implement, by the first upstream layer, the second machine learning algorithm including a backpropagation algorithm.

* * * * *